US009344300B1

(12) United States Patent
Acimovic et al.

(10) Patent No.: US 9,344,300 B1
(45) Date of Patent: May 17, 2016

(54) APPARATUS AND METHODS FOR VARIABLE PEAKING AND LOW PASS FILTERING EQUALIZATION

(71) Applicant: MICROSEMI STORAGE SOLUTIONS (U.S.), INC., Aliso Viejo, CA (US)

(72) Inventors: Predrag Acimovic, Burnaby (CA); Vadim Milirud, Port Moody (CA)

(73) Assignee: MICROSEMI STORAGE SOLUTIONS (U.S.), INC., Aliso Viejo, CA (US)

( * ) Notice: Subject to any disclaimer, the term of this patent is extended or adjusted under 35 U.S.C. 154(b) by 143 days.

(21) Appl. No.: 14/296,412

(22) Filed: Jun. 4, 2014

(51) Int. Cl.
*H04B 3/04* (2006.01)
*H04L 25/03* (2006.01)

(52) U.S. Cl.
CPC ............ *H04L 25/03019* (2013.01); *H04B 3/04* (2013.01); *H04L 2025/037* (2013.01)

(58) Field of Classification Search
CPC ............ H04B 3/14; H04B 3/04; H04B 3/145; H04B 3/148; H04L 25/03878
USPC ......................................... 333/28 R; 375/229
See application file for complete search history.

(56) References Cited

U.S. PATENT DOCUMENTS

| 7,499,489 | B1 | 3/2009 | Ellersick et al. | |
| 7,656,939 | B2 | 2/2010 | Gondi et al. | |
| 7,839,212 | B2 | 11/2010 | Huang et al. | |
| 2001/0008385 | A1* | 7/2001 | Zeijl | H03H 11/04 333/28 R |
| 2008/0238588 | A1 | 10/2008 | Yeung et al. | |
| 2012/0133459 | A1* | 5/2012 | Zhuang | H04B 3/14 333/28 R |

FOREIGN PATENT DOCUMENTS

WO 2006/066167 6/2006

* cited by examiner

*Primary Examiner* — Stephen E Jones
(74) *Attorney, Agent, or Firm* — Dennis R. Haszko

(57) ABSTRACT

This disclosure provides methods and apparatus for processing differential signals having non-inverted and inverted signals. An example apparatus has first and second circuit arms, each arm connected to receive one of the input signals. Each arm has a main signal path for carrying the respective input signal, and a secondary signal path for carrying a voltage divided and low-pass filtered version of the respective input signal. The outputs of the main and secondary signal paths are combined to produce equalized output signals.

19 Claims, 16 Drawing Sheets

APPARATUS AND METHODS FOR VARIABLE PEAKING AND LOW PASS FILTERING EQUALIZATION

FIELD

The present disclosure relates generally to the field of data communication. More particularly, aspects of the present disclosure may be applied in data communication systems where the data is sent differentially over transmission lines. Aspects can also be applied in any electronic printed circuit board (PCB) or integrated circuit (IC) to equalize received communication signals.

BACKGROUND

High speed digital data communications over wired or wireless communication channels are exploding in usage. Serial data communication over wires has been increasing almost exponentially in recent years. For example, traffic cameras and video on demand over internet are only two of many applications that use high speed data communications. Larger and larger amount of data is being generated, and data communication rates increase every year. It is generally desirable to store newly generated data, which typically requires sending the data from the place of generation to a different location where it will be stored. Further, once the data has been stored, means must be provided to facilitate searching and retrieval of the stored data.

Moving large amount of data usually is done with the use of Serializer-Deserializer (SERDES) transceivers. In some instances there is large attenuation between the end points where the data is to be moved. The attenuation between end points is higher at higher frequencies than at low frequencies. High speed data transfer uses large frequency bandwidth, and frequency dependent attenuation causes distortion and errors in data transmission. Today there are communication systems with SERDES devices that can transfer data at rates of more than 20 Gbps. Such large data rate communication usually requires a wide frequency bandwidth channel to carry the information, and communication channels typically have insertion losses proportional to the signal frequencies, such that higher frequency signals are attenuated more than lower frequency signals. The band-limiting due to attenuation of high frequencies in the channel cause inter-symbol interference (ISI) that ultimately results in errors. To overcome this problem it is generally necessary to equalize all frequencies in the communications bandwidth so that insertion loss is equal at all frequencies that are important in data transmission.

Another problem that equipment manufacturers face is the power dissipation because usually there are increasing number of SERDES devices in small volume that consume fairly large power. Today there are communication integrated circuits (ICs) that have 100 or more high speed SERDES transmitters and receivers. One of main problems with this kind of circuit density is that it can be difficult to remove dissipated power.

The inventors have determined a need for improved apparatus and methods for equalizing communication signals.

SUMMARY

One aspect provides a method comprising receiving an input differential signal comprising a non-inverted signal and an inverted signal, voltage dividing the non-inverted signal to produce a secondary non-inverted signal, voltage dividing the inverted signal to produce a secondary inverted signal, low pass filtering the secondary non-inverted and inverted signals, and, combining the non-inverted and inverted signals with the low pass filtered secondary non-inverted and inverted signals to produce a non-inverted output signal and an inverted output signal.

Combining the non-inverted and inverted signals with the low pass filtered secondary non-inverted and inverted signals may comprise adding the low pass filtered secondary inverted signal to the non-inverted signal to produce the non-inverted output and adding the low pass filtered secondary non-inverted signal to the inverted signal to produce the inverted output signal.

Combining the non-inverted and inverted signals with the low pass filtered secondary non-inverted and inverted signals may comprise subtracting the low pass filtered secondary non-inverted signal from the non-inverted signal to produce the non-inverted output and subtracting the low pass filtered secondary inverted signal to the inverted signal to produce the inverted output signal.

The method may comprise passing the non-inverted signal through a first main path inductance and passing the inverted signal through a second main path inductance. The first main path inductance may comprise a first primary winding of a first main path transformer comprising a first secondary winding magnetically coupled to the first primary winding and a first variable resistance connected to the first secondary winding, and the second main path inductance may comprise a second primary winding of a second main path transformer comprising a second secondary winding magnetically coupled to the second primary winding and a second variable resistance connected to the second secondary winding. The method may further comprise controlling the first main path inductance by adjusting the first variable resistance and controlling the second main path inductance by adjusting the second variable resistance. The method may further comprise passing the non-inverted signal through a first secondary path inductance prior to voltage dividing the non-inverted signal to produce the secondary non-inverted signal, and passing the inverted signal through a second secondary path inductance prior to voltage dividing the inverted signal to produce the secondary inverted signal.

The method may comprise passing the non-inverted signal through a first secondary path inductance prior to voltage dividing the non-inverted signal to produce the secondary non-inverted signal, and passing the inverted signal through a second secondary path inductance prior to voltage dividing the inverted signal to produce the secondary inverted signal. The first secondary path inductance may comprise a first primary winding of a first secondary path transformer comprising a first secondary winding magnetically coupled to the first primary winding and a first variable resistance connected to the first secondary winding, and the second secondary path inductance may comprise a second primary winding of a second secondary path transformer comprising a second secondary winding magnetically coupled to the second primary winding and a second variable resistance connected to the second secondary winding.

The method may comprise amplifying the non-inverted and inverted signals and the secondary non-inverted and inverted signals prior to combining the non-inverted and inverted signals with the low pass filtered secondary non-inverted and inverted signals.

Another aspect provides an apparatus comprising a first circuit arm having a first input for receiving a non-inverted input signal of a differential signal and a first output for outputting a non-inverted output signal of the differential signal, and a second circuit arm having a second input for receiving an inverted input signal of the differential signal and a second output for outputting an inverted output signal of the differential signal. The first circuit arm comprises a first main signal path connected between the first input and the first output, and, a first secondary signal path connected to the first input through a first voltage divider, the first secondary signal path comprising a first low pass filter. The second circuit arm comprises a second main signal path connected between the second input and the second output, and a second secondary signal path connected to the second input through a second voltage divider, the second secondary signal path comprising a second low pass filter. The first circuit arm further comprises a first combining circuit for combining an output of the one of the first and second low pass filters with a first main signal on the first main signal path to produce the non-inverted output signal, and the second circuit arm further comprises a second combining circuit for combining an output of the other of the first and second low pass filters with a second main signal on the second main signal path to produce the inverted output signal.

The first combining circuit may comprise a first adder connected to add the output of the second low pass filter to the first main signal to produce the non-inverted output, and the second combining circuit may comprise a second adder connected to add the output of the first low pass filter to the second main signal to produce the inverted output signal.

The first combining circuit may comprise a first subtractor connected to subtract the output of the first low pass filter from the first main signal to produce the non-inverted output, and the second combining circuit may comprises a second subtractor connected to subtract the output of the second low pass filter from the second main signal to produce the inverted output signal.

The apparatus may comprise a first main path inductance along the first main signal path and a second main path inductance along the second main path. The first main path inductance may comprise a first primary winding of a first main path transformer comprising a first secondary winding magnetically coupled to the first primary winding and a first variable resistance connected to the first secondary winding, and the second main path inductance may comprise a second primary winding of a second main path transformer comprising a second secondary winding magnetically coupled to the second primary winding and a second variable resistance connected to the second secondary winding. The apparatus may further comprise a first secondary path inductance connected between the first input and the first voltage divider and a second secondary path inductance connected between the second input and the second voltage divider.

The apparatus may comprise a first secondary path inductance connected between the first input and the first voltage divider and a second secondary path inductance connected between the second input and the second voltage divider. The first secondary path inductance may comprise a first primary winding of a first secondary path transformer comprising a first secondary winding magnetically coupled to the first primary winding and a first variable resistance connected to the first secondary winding, and the second secondary path inductance may comprise a second primary winding of a second secondary path transformer comprising a second secondary winding magnetically coupled to the second primary winding and a second variable resistance connected to the second secondary winding.

The apparatus may comprise an amplifier along each of the first main path, the second main path, the first secondary path and the second secondary path.

Other aspects and features of the present disclosure will become apparent to those ordinarily skilled in the art upon review of the following description of specific embodiments in conjunction with the accompanying figures.

BRIEF DESCRIPTION OF DRAWINGS

Embodiments of the present disclosure will now be described, by way of example only, with reference to the attached Figures.

DETAILED DESCRIPTION

This disclosure presents new methods and apparatus for equalizing signals. Certain embodiments provide equalizers that have relatively low power consumption. In some embodiments, analog front end circuits for high speed digital SER-DES devices are provided that have relatively small area requirements. In some embodiments, such analog front end circuits are integrated into integrated circuits (ICs) with a high density of SERDES devices. Certain preferred embodiments provide the equalization with more than 20 dB of channel loss at the Nyquist frequency of a signal. The Nyquist frequency of a signal is a frequency equal to half a symbol rate of the signal. Some embodiments may be implemented with only passive components, while still providing a maximum signal amplification of about 10 dB. In contrast with many current art equalizers, circuits according to certain embodiments are relatively simple, occupy small areas, and provide amplitude equalization without significantly altering a phase transfer function. In some embodiments, initial basic equalization can be achieved without acquiring bit timing. Certain embodiments may provide equalizers that outperform known equalizers comprising active devices with emitter/source degeneration or analog finite impulse response (AFIR) filters.

Introduction

Figure 1:
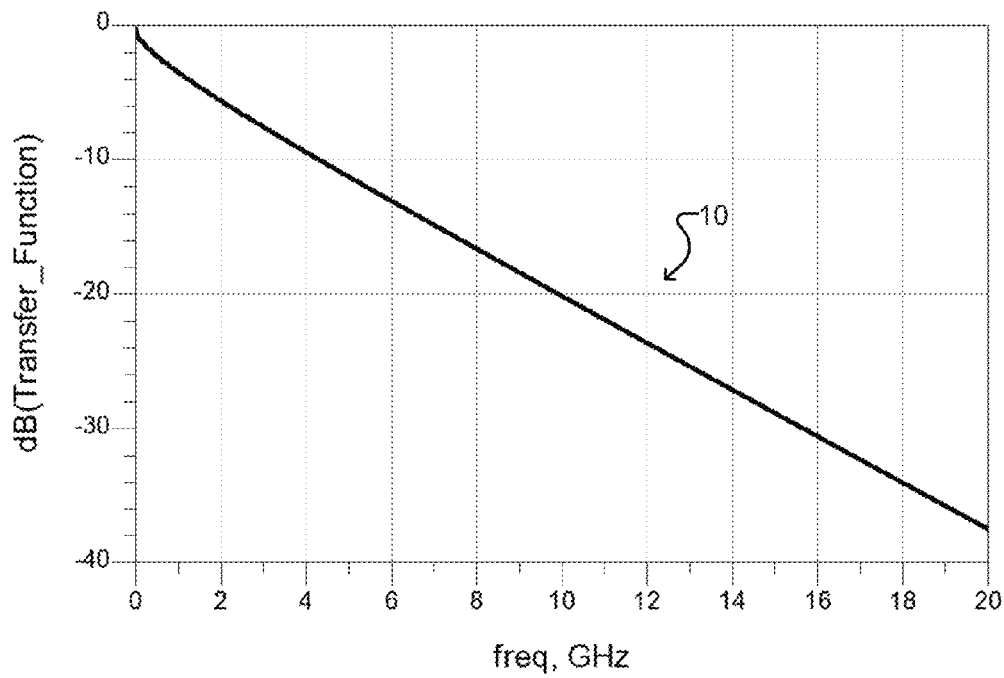
FIG. 1 shows an example transfer function for a non-equalized channel that has about 27 dB insertion loss at 14 GHz.
Figure 2:
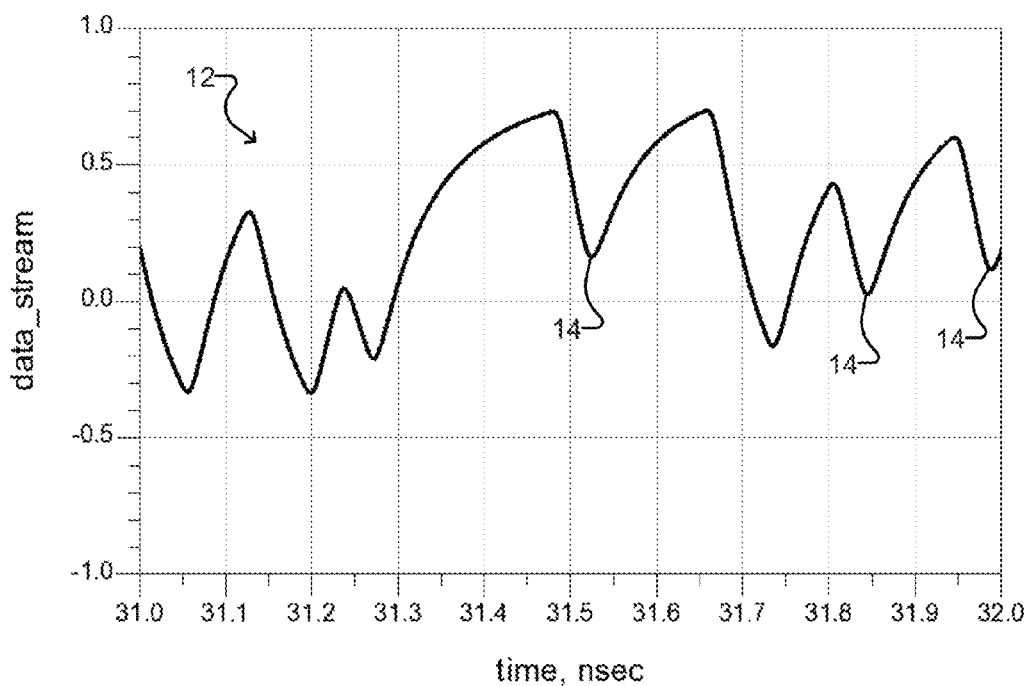
FIG. 2 shows a data waveform of an example 28 Gbps signal after passing through a non-equalized channel.

FIG. 1 shows an example amplitude transfer function 10 of a hypothetical channel. In the illustrated example, the channel has an insertion loss in excess of 20 dB at the Nyquist frequency. The resulting band limiting causes inter symbol interference (ISI) in such a manner that a long string of data without change that precedes a data change can cause errors. FIG. 2 shows an example data waveform 12 of a 28 Gbps signal after passing through a non-equalized channel like the FIG. 1 example. Errors 14 occur when data changes but the signal at the output of the channel does not cross the zero threshold, so no data change is detected.

As it can be seen from FIG. 2 at the instance of each error 14, the signal voltage change is smaller than an accumulated signal voltage from previous bits. There are two basic approaches to address this problem.

Figure 3:
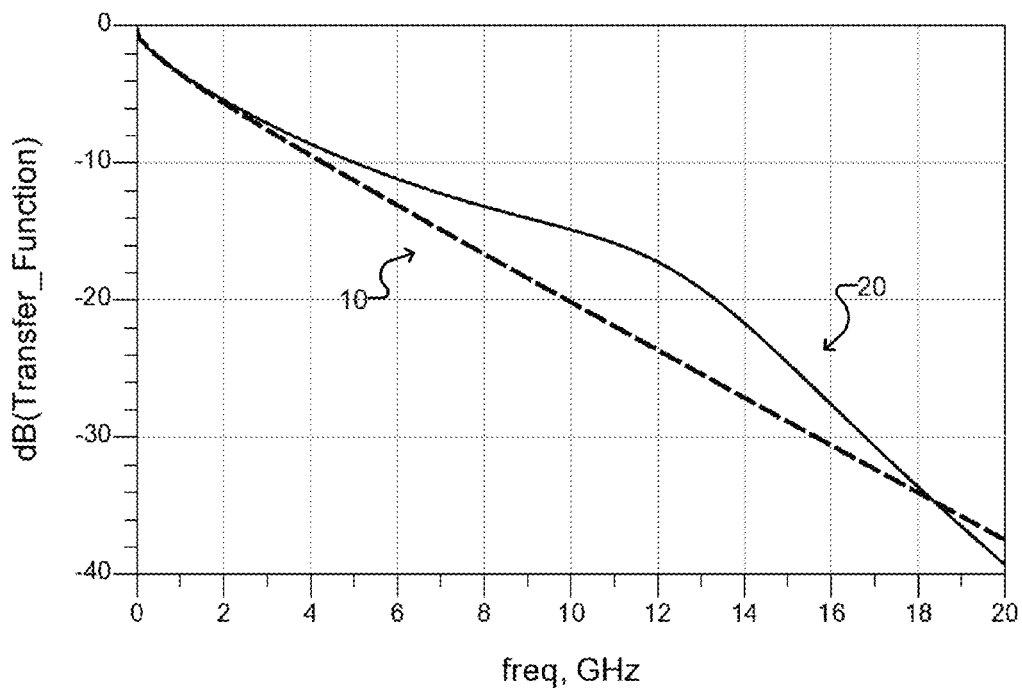
FIG. 3 shows an example overall amplitude transfer function for a receiver with a peaking circuit.
Figure 4:
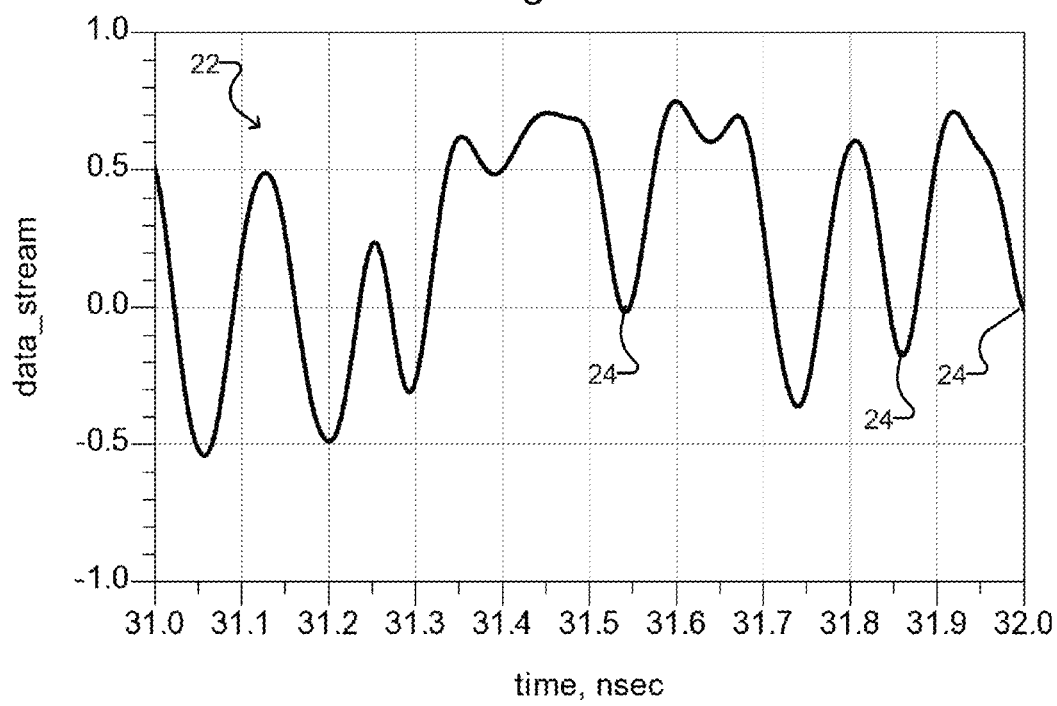
FIG. 4 shows a data waveform of an example 28 Gbps signal after passing through a receiver with a peaking circuit.

One approach is to increase the amplitude of the signal waveform when there is a data change. This requires selective amplification of frequencies near the Nyquist frequency. This can be achieved with a peaking circuit. FIG. 3 shows an example overall amplitude transfer function 20 for a signal received from a channel by a receiver with a peaking circuit. The dashed trace 10 shows the overall amplitude transfer function for the channel without peaking, and the solid trace 20 shows the transfer function when peaking circuit added to receiver. FIG. 4 shows a corresponding example data waveform 22. Due to enhancement of the frequencies around the Nyquist frequency the errors can be removed, as indicated at data changes 24 where the signal crosses the zero threshold.

Figure 5:
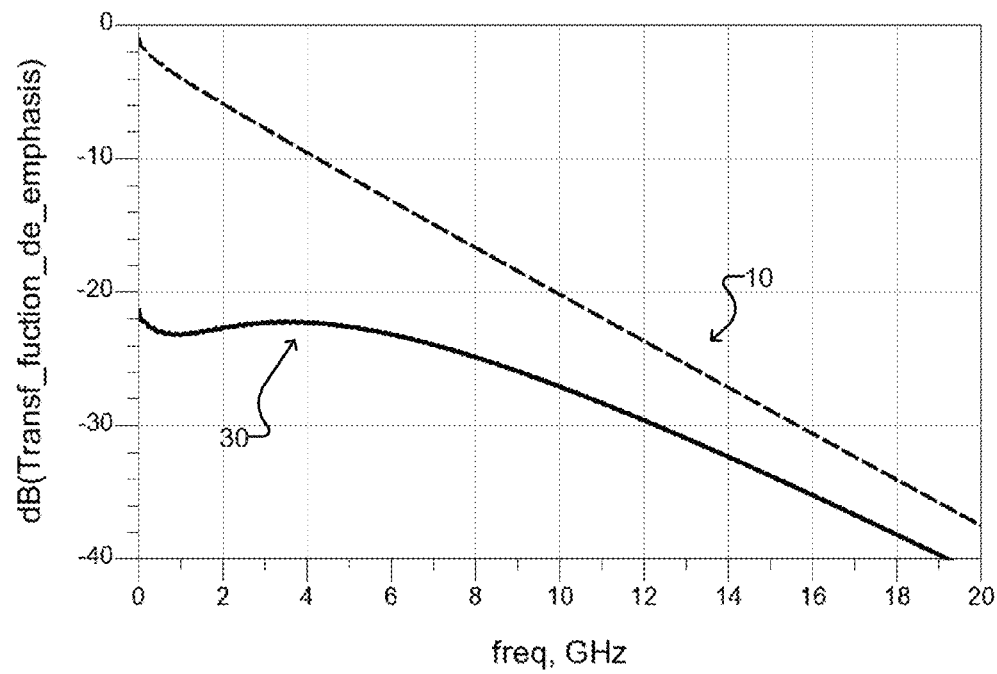
FIG. 5 shows an example overall amplitude transfer function for a receiver with a de-emphasis circuit.
Figure 6:
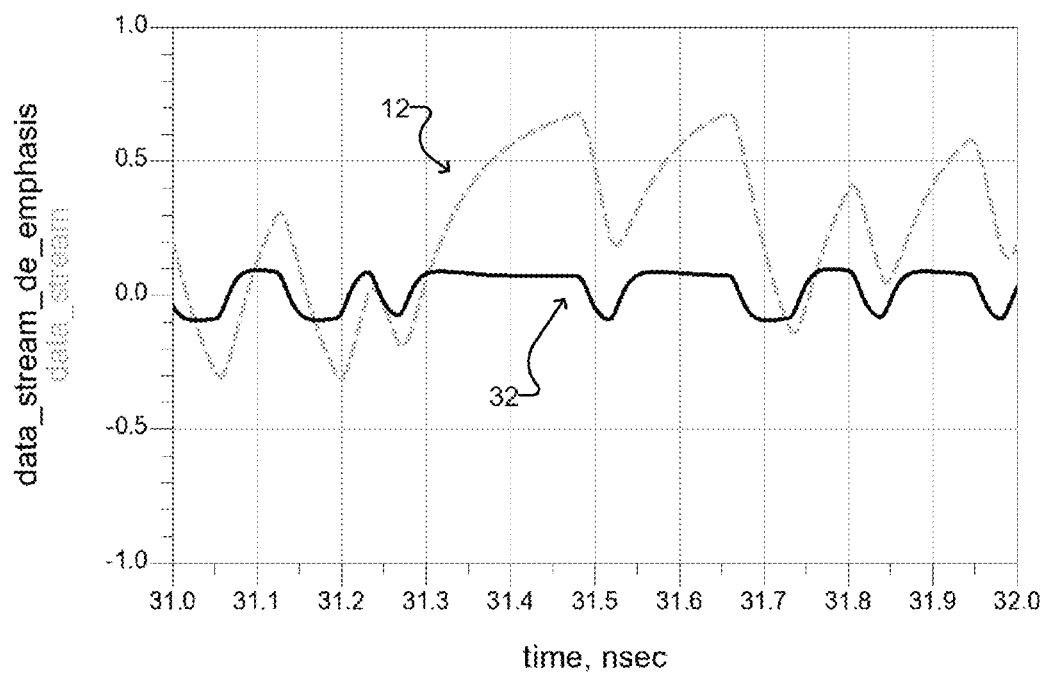
FIG. 6 shows a data waveform of an example 28 Gbps signal after passing through a receiver with a de-emphasis circuit.

Another approach is to attenuate low frequencies more than frequencies near the Nyquist frequency. This is referred to as de-emphasis. De-emphasis results in a reduction of the accumulated voltage of previous bits with no data change. FIG. 5 shows an example overall amplitude transfer function 30 for a signal received from a channel by a receiver with de-emphasis (solid trace), in comparison to the transfer function 10 for a signal received without de-emphasis (dashed trace). FIG. 6 shows example respective signal data waveforms 32 (with de-emphasis) and 12 (without de-emphasis). As shown in FIG. 6, de-emphasis makes the received waveform 32 free of errors, but the signal level is reduced in comparison to the waveform 12 without de-emphasis.

To recover the signal level after using a de-emphasis circuit it is often necessary to use broad-band amplifiers. Amplifiers use substantial amount of powers. Further, when amplifiers are used power supply noise can be injected into signal, and additional complexity in power supply design can be required to avoid such noise.

Problem Statement

In high speed SERDES transmission large band limiting in channels causes severe ISI that closes the eye. Equalizers are used to combat the ISI.

Nyquist proposed three criteria for how to construct an overall data communication channel that will be free of ISI at one instance in the symbol interval. Most, but not all, data communication systems use the so called "First Nyquist Symmetry Criterion" for ISI free data transmission, as described for example in "Certain Topics in Telegraph Transmission Theory" by Henry Nyquist (available at http://web.archive.org/web/20060706192816/http://www.loe.ee.uptras.gr/Comes/Noes/Nygu ist.pdf) and John G. Proakis, *"Digital Communications, 3rd Edition", McGraw-Hill Book Co.*, 1995. *ISBN* 0-07-113814-5, which are hereby incorporated by reference herein. In order to satisfy the First Nyquist Symmetry Criterion, the real component of the overall channel transfer function is required to possess odd symmetry in respect to a value 0.5 at Nyquist Frequency, and the imaginary component of the transfer function is required to possess even symmetry in respect to Nyquist Frequency.

For minimum phase networks, the real and imaginary components of the transfer function are related via a Hilbert transformation. Accordingly, if the real component of the transfer function is made to satisfy the First Nyquist Symmetry Criterion, the rest will follow.

Figure 7:
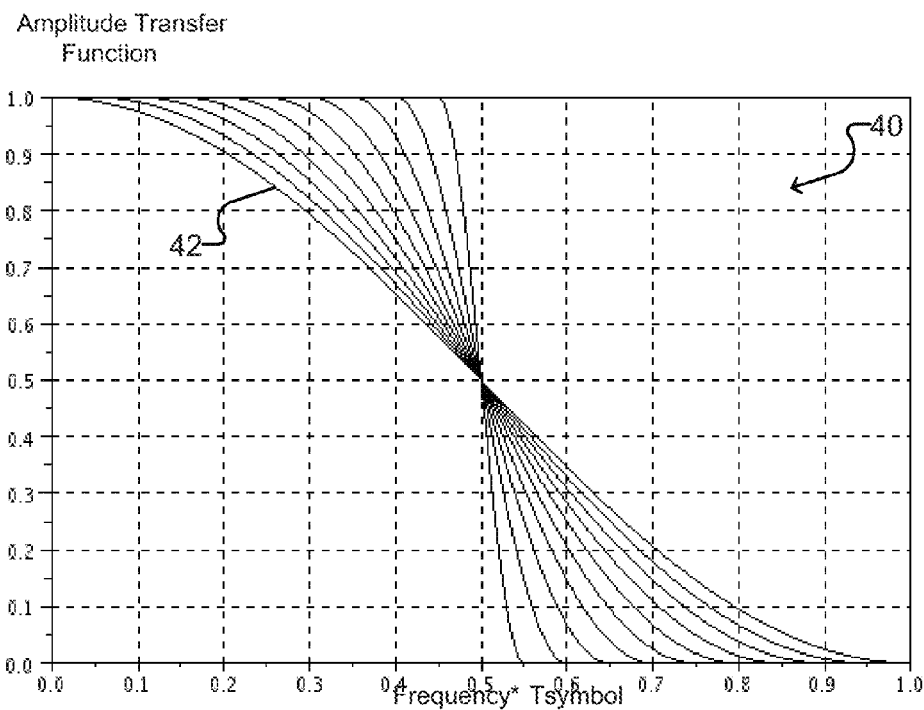
FIG. 7 shows an example set of real components of transfer functions that satisfy a first Nyquist symmetry criterion for ISI free data transmission.
Figure 8:
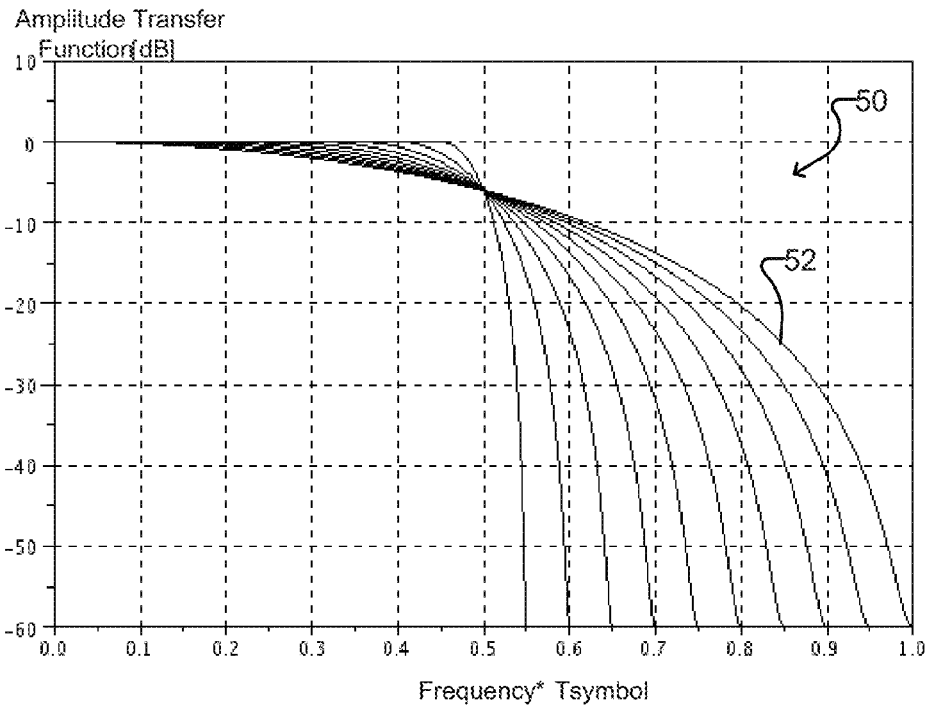
FIG. 8 shows an example set of Nyquist symmetry transfer functions that satisfy ISI free data transmission criterion at one sampling point in symbol in a log-linear plot.

Nyquist determined that there are an infinite number of transfer functions that satisfy the First Nyquist Symmetry Criterion for ISI free data transmission. FIG. 7 shows an example set 40 of functions that satisfy the First Nyquist Symmetry Criterion for ISI free sampling, and FIG. 8 shows a corresponding example set 50 of functions in a log-linear plot. In each of the sets 40 and 50 of FIGS. 7 and 8, a so-called "raised cosine" function 42/52 is indicated. The raised cosine function exhibits two ISI free sampling points in the symbol interval.

The combined effect of a transmitter, a channel and a receiver should preferably result in an overall transfer function with as close as possible to 6 dB loss at the Nyquist frequency and have odd symmetry around the Nyquist frequency to approximate the Nyquist ISI free data transmission transfer function. This is illustrated in FIG. 8. The data transmission channel is usually a pair of transmission lines, therefore the insertion loss in dB is almost linearly increasing with frequency, as shown in FIG. 1. Band-limiting requires equalization of the channel to reduce the ISI. An equalizer according to certain embodiments preferably has a transfer function that is an inverse of the channel transfer function up to some frequency relatively close to the Nyquist frequency. How close it depends on the slope of attenuation at the Nyquist frequency. As shown in FIG. 7, in order to satisfy the First Nyquist Symmetry Criterion for ISI free sampling, it is necessary for the transfer function to be zero at all frequencies above the 2 times the Nyquist frequency. This means that in one octave, the transfer function must drop from an attenuation of −6 dB to an attenuation of about −40 dB or more. A high order network (e.g., a filter circuit with several reactive elements, such as capacitors and inductors, arranged to approximate specific low-pass, high-pass, band-pass, and band-stop transfer functions) is typically needed to approximate the First Nyquist Symmetry Criterion.

Because in one octave, from the Nyquist frequency to two times the Nyquist frequency, the transfer function has to achieve insertion loss of at least 20 dB (preferably more than 40 dB) it follows that the combined transmitter, channel and receiver should preferably have an overall transfer function that is substantially constant from DC to some "cut-off" frequency that is lower than the Nyquist frequency. Above this cut-off frequency attenuation should steeply increase, as shown in FIG. 8.

A high-Q peaking circuit can be used to improve approximation of the First Nyquist Symmetry Criterion. One problem is how to best choose a circuit topology that can be adapted to various channels with different frequency dependent insertion loss and data rates, so the overall transfer function best approximates the First Nyquist Symmetry Criterion for ISI free sampling.

Overview

The present disclosure provides methods and apparatus for equalization that combine both de-emphasis and peaking. Certain embodiments advantageously combine de-emphasis and peaking in a manner that provides a synergistic response with improved equalization in comparison either de-emphasis or peaking alone.

Figure 9:
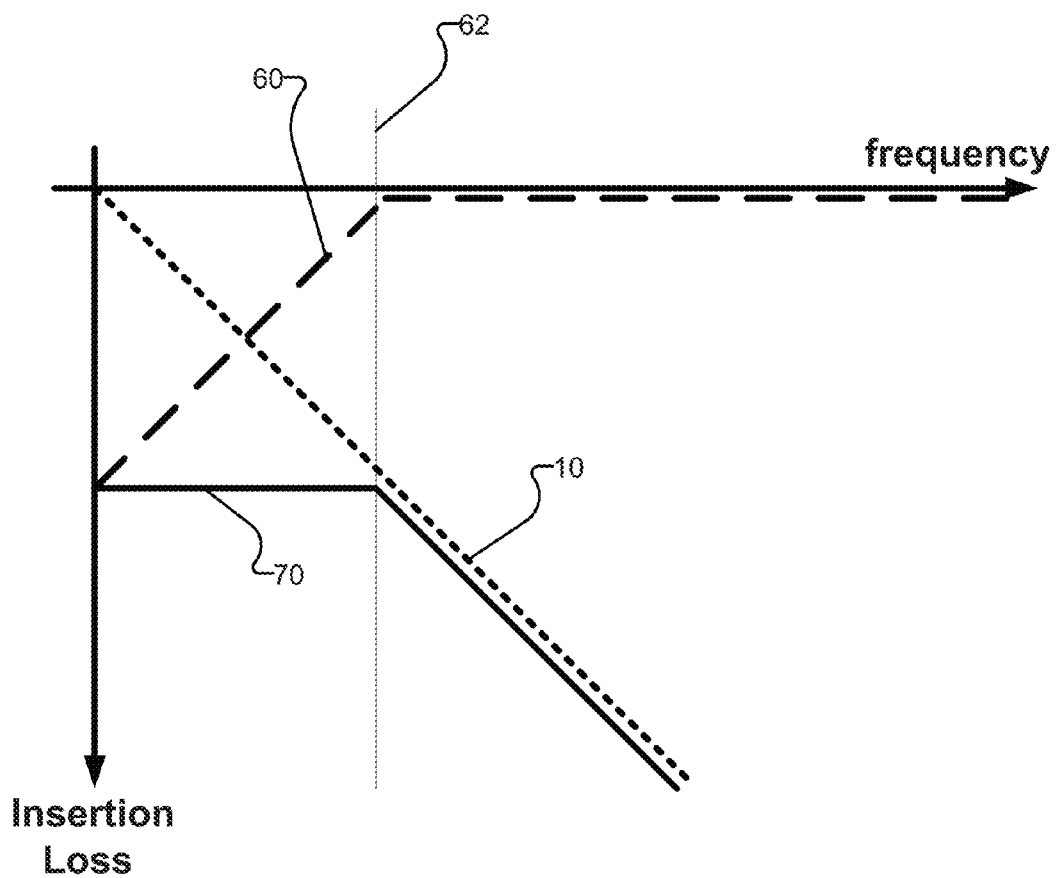
FIG. 9 is a graph showing a piecewise approximation of a channel transfer function, an equalizer transfer function, and an overall transfer function.

FIG. 9 schematically illustrates a piecewise approximation of a zero-pole equalizer. The channel transfer function 10 has an insertion loss that is almost linearly increasing with frequency, as was the case in FIG. 1. The equalizer transfer function 60 is the inverse of the channel transfer function 10 from DC to a cut-off frequency 62. Equalizers according to preferred embodiments have one zero at very low frequencies and one pole at higher frequencies, and the zero and pole are spaced so to match the insertion loss slope of the channel between DC and the cut-off frequency 62. This results in a flat overall response from DC to cut-off frequency, as indicated by the overall transfer function 70 shown in FIG. 9. As discussed above, the cut-off frequency 62 should be lower than Nyquist frequency. Above the cut-off frequency 62 the overall transfer function 70 follows the channel transfer function 10. The slope of the channel transfer function 10 depends on channel characteristics and it is unlikely that the overall transfer function will match the First Nyquist Symmetry Criterion for ISI free sampling point, without adjustment. As discussed below, certain embodiments of the present disclosure provide circuits with topologies that will allow a change of the slope of the overall transfer function 70 above the cut-off frequency 62.

Channels with low insertion loss can present an ISI problem, although low insertion loss should result in large signal amplitude. In such cases there will be enough signal content above the symbol rate. Because of linear amplitude and linear phase distortion this high frequency content can cause errors. For this type of channel equalizers according to preferred embodiments maximize attenuation of all frequencies above the symbol rate.

The present disclosure provides apparatus and methods to approximate transfer functions that satisfy the First Nyquist Symmetry Criterion for ISI free sampling point in one symbol interval. Certain embodiments use a variable peaking circuit that comprises a transformer, such as for example the peaking circuits disclosed in U.S. patent application Ser. No. 13/826, 551 filed Mar. 14, 2013, which is hereby incorporated by reference herein. As described below, the primary winding of the transformer is in the main path of the receiver, and the inductance and Q factor of this main path inductor can be controlled by changing the current in the secondary winding. Providing a variable inductance allows for better approximation of the First Nyquist Symmetry Criterion for the ISI free sampling point within the symbol interval.

Certain embodiments combine a variable peaking circuit and a de-emphasis circuit implemented as a low pass circuit. Such circuits have the capability to match the requirements for ISI free sampling functions above the Nyquist frequency, in contrast with certain prior art circuits. Certain preferred embodiments also provide a reduction in power requirements because excellent ISI cancelation removes need for a Decision Feedback Equalizer (DFE). If power penalty can be afforded and a DFE is used, then the DFE can be used to cancel ISI generated due to reflections in the channel, but not ISI generated due to band-limiting. Circuits according to some embodiments use no power or almost no power.

Example Embodiments

Figure 10:
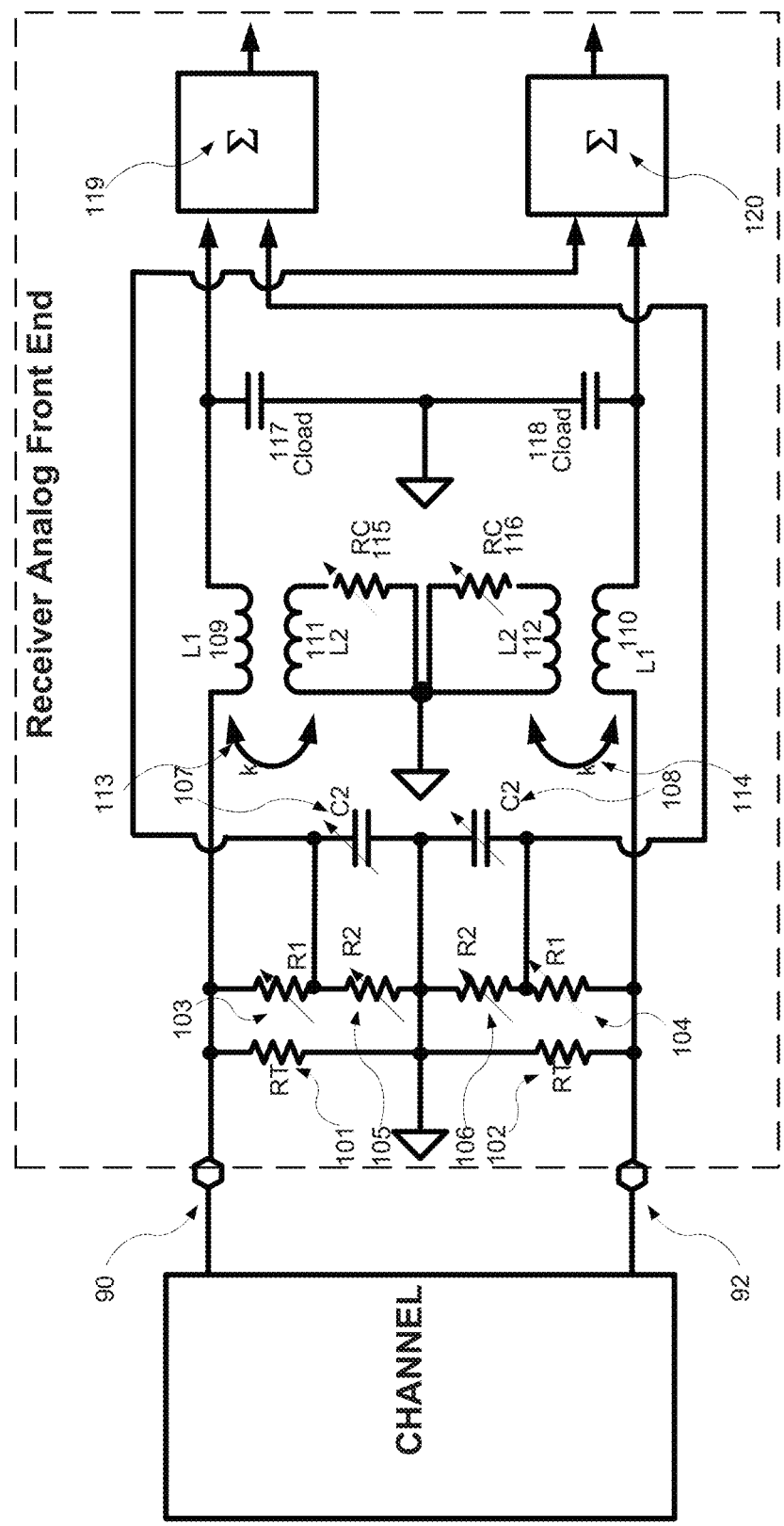
FIG. 10 shows an example equalizer circuit according to one embodiment.

FIG. 10 shows an example embodiment of an analog front end (AFE) of SERDES receiver. In the illustrated example differential signal transmitted over a channel is received at inputs 90 and 92, with a "non-inverted" or "positive" first input signal received at input 90 and an "inverted" or "negative" second input signal received at input 92. A first input resistor 101 is connected between a first main signal path that receives the first input signal from input 90 and ground, and a second input resistor 102 is connected between a second main signal path that receives the second input signal from input 92 and ground. Resistors 101 and 102 are terminations at the input of the AFE. It is a standard requirement that receivers terminate a channel to minimize reflections.

De-emphasis may be implemented by low pass filtering the input signals and subtracting the filtered signals from the unfiltered signals to result in high pass filter that favors high frequencies in respect to low frequencies. Resistors 103 and 105 form a first voltage divider, and capacitor 107 forms a first low pass filter. The first voltage divider (103/105) is connected between the first main signal path and ground, and receives the first input signal to provide a secondary first input signal to a first secondary signal path. The secondary first input signal is low pass filtered by capacitor 107. Resistors 104 and 106 form a second voltage divider, and capacitor 108 forms a second low pass filter. The second voltage divider (104/106) is connected between the second main signal path and ground, and receives the second input signal to provide a secondary second input signal to a second secondary signal path. The secondary second input signal is low pass filtered by capacitor 108. Capacitors 107 and 108 each have a capacitance C2, which may be a variable capacitance.

Resistors 103 and 104 have a resistance R1, and resistors 105 and 106 have a resistance R2. In the illustrated example, both R1 and R2 are shown as variable resistances, but in some embodiments only one of R1 and R2 is variable. Either R1 or R2 can be a variable resistance. Implementing R2 as a variable resistance is easier as one terminal of each of resistors 105 and 106 is connected to ground. Also, implementing R1 as a fixed resistance should result in resistors 103 and 104 causing less loading on input 90 and 92, respectively.

In the FIG. 10 example, an inductance is provided in each of the first and second main signal paths. The first signal main path uses a transformer (which may be referred to as a "peaking transformer") comprising a primary winding 109 and a secondary winding 111, coupled with coefficient of magnetic coupling k 113. The inductance and Q of the primary winding 109 is controlled by changing the resistance in the secondary winding 111 circuit via a variable resistor 115. The second main signal path uses a transformer (which may be referred to as a "peaking transformer") comprising a primary winding 110 and a secondary winding 112, coupled with coefficient of magnetic coupling k 114. The inductance and Q of the primary winding 110 is controlled by changing the resistance in the secondary winding 112 circuit via a variable resistor 116.

Capacitors 117 and 118 determine the cut-off frequency for the example receiver of FIG. 10. The capacitors 117 and 118 form low pass circuits with the peaking transformers of the respective main circuit paths.

A first summing circuit 119 combines the signal from the first main signal path with the signal from the second secondary signal path. A second summing circuit 120 combines the signal from the second main signal path with the signal from the first secondary signal path. As one of skill in the art of designing CMOS circuits will appreciate, summation circuits 119 and 120 can be implemented in any of a number of suitable ways.

To describe how the de-emphasis portion of the FIG. 10 circuit operates it is useful to initially consider the circuit without any transformers. If the first main signal path does not have inductor 109 and the second main signal path does not have inductor 110, then each of the first and second main signal paths can be considered as having voltage gain of 1, and the transfer function can be written as:

$$TF1 = \frac{R2}{R2+R1} \cdot \frac{1}{1+s \cdot C2 \cdot \left(\frac{R1 \cdot R2}{R1+R2}\right)} = k1 \cdot \frac{1}{1+s \cdot \tau 1}$$

$$k1 = \frac{R2}{R2+R1}$$

$$\tau 1 = C2 \cdot \left(\frac{R1 \cdot R2}{R1+R2}\right); \quad (1-k1) = \frac{R1}{R2+R1}$$

$$TFtotal = 1 - TF1 = \frac{1-k1+s \cdot \tau 1}{1+s \cdot \tau 1} = (1-k1) \cdot \frac{1+s \cdot \left(\frac{\tau 1}{1-k1}\right)}{1+s \cdot \tau 1}$$

Figure 11:
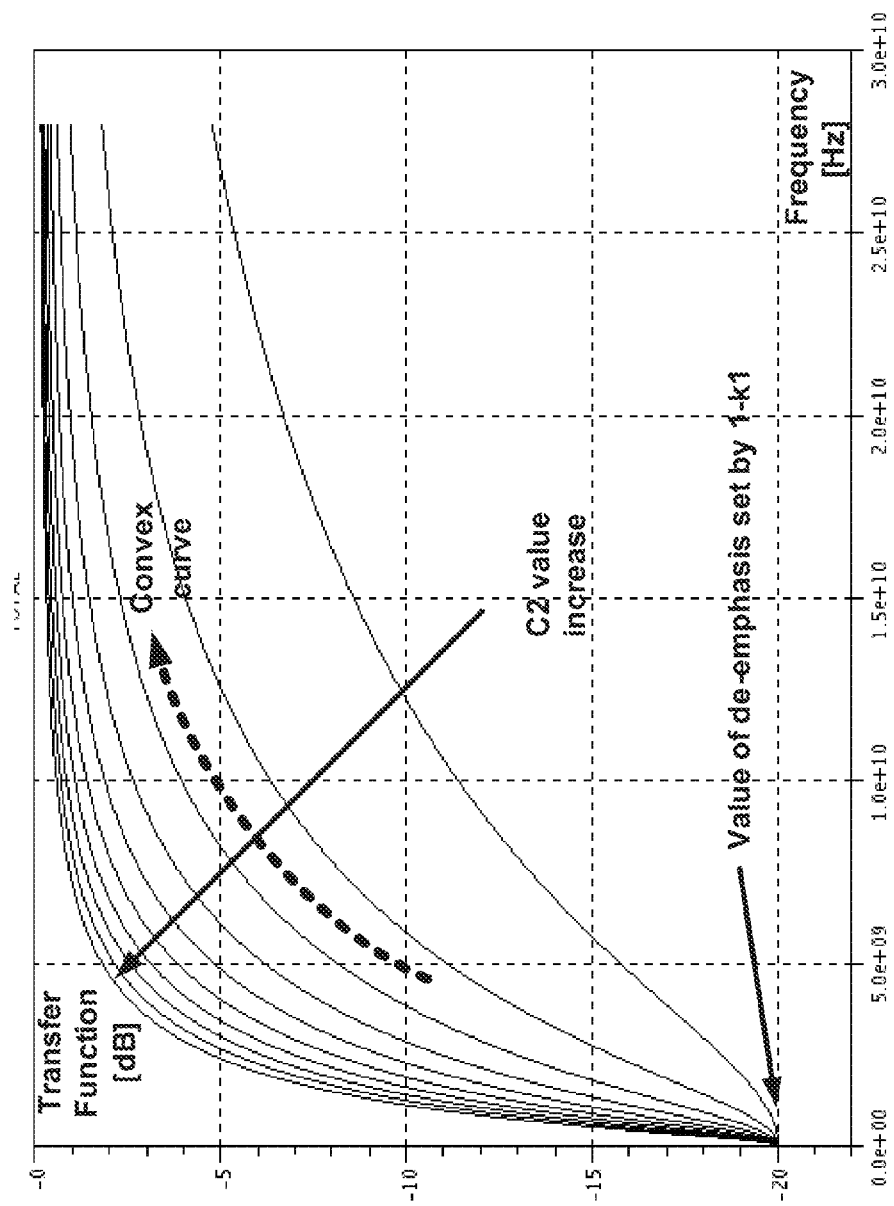
FIG. 11 shows example transfer functions of de-emphasis circuits

The DC value of de-emphasis is determined by the values of resistances R1 and R2 and is equal to (1−k1). The above transfer function has one pole and one zero. The pole value is determined by τ1 and the zero value is determined by τ1/1−k1. The pole and zero are thus related by the factor (1−k1). However, this factor cannot be chosen independently because (1−k1) also sets the DC de-emphasis level. This may not be too constraining, since the transfer function can also be adjusted by adjusting C2, as can be seen in FIG. 11. The DC value of de-emphasis is set first. This can be done without acquiring precise bit timing because it will have approximately the same level for signals with long strings where the data does not change and signals with alternating data. In some embodiments, the largest C2 value may be used initially, and then the value of C2 may be decreased to improve both horizontal and vertical eye opening. In other embodiments, an acquisition and tracking circuit (not shown) may be provided to optimize the value of C2, as well as R1/R2 and values of any other adjustable circuit elements, based on error measurements or other performance measurements.

Figure 12:
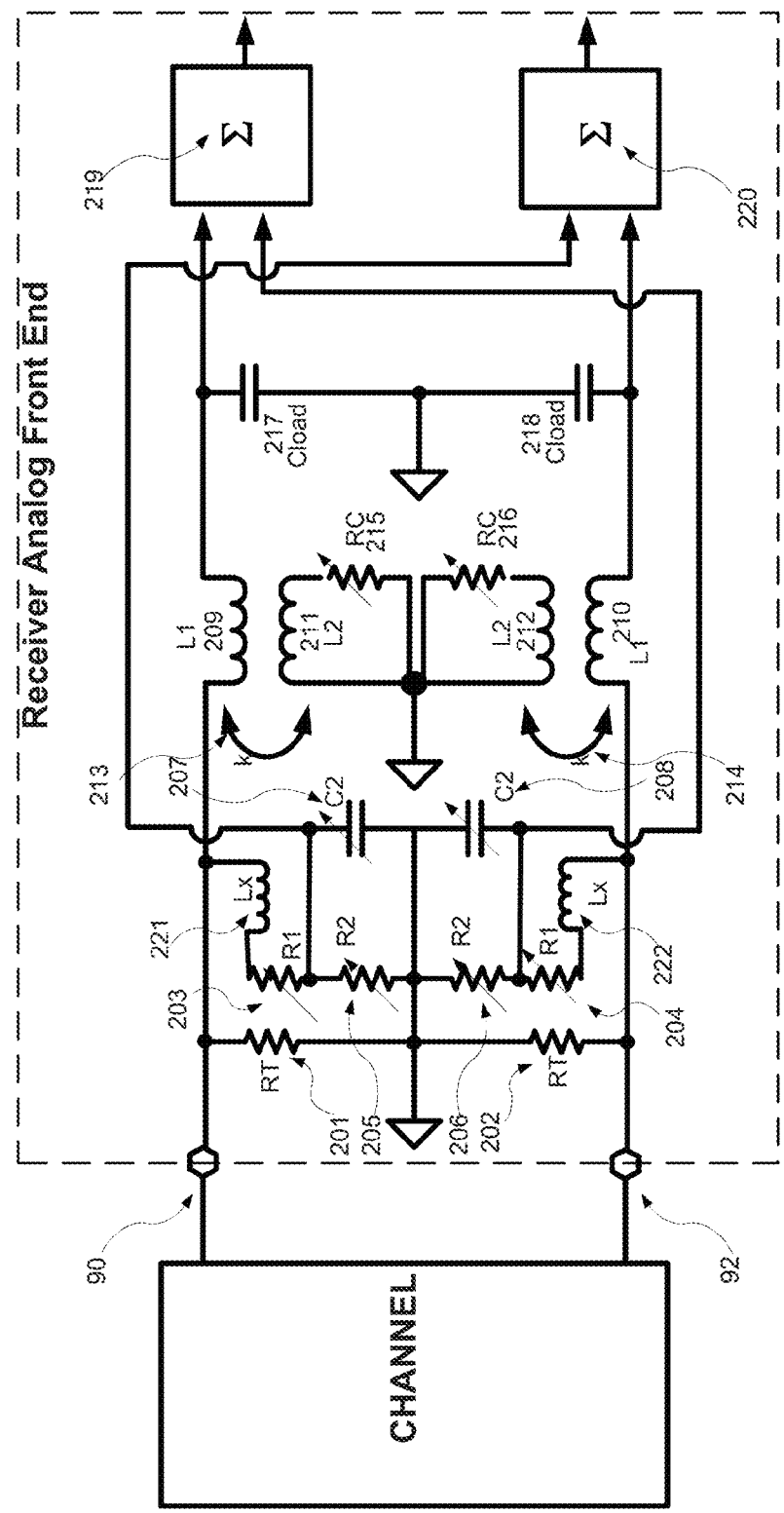
FIG. 12 shows an example equalizer circuit according to one embodiment.

FIG. 12 shows an example circuit according to another embodiment. The circuit of FIG. 12 is similar to the circuit of FIG. 10, and corresponding elements are labeled with corresponding reference numerals in the form of 2xx instead of 1xx and will not be described again to avoid repetition. The FIG. 12 circuit differs from the circuit in FIG. 10 with the addition of two inductors 221 and 222, each having an inductance Lx. Inductor 221 is connected between the first main signal path and the voltage divider at the start of the first secondary signal path. Inductor 222 is connected between the second main signal path and the voltage divider at the start of the second secondary signal path. The addition of these inductors modifies the performance of the equalizer significantly. This is one advantage of the topology disclosed herein that uses a main and a secondary signal path for each of the first and second signals, since such topology allows the signals in each path to be processed differently.

The transfer function of circuit in FIG. 12, if considered without the first and second main signal path transformers (209/211 and 210/212), can be written as:

$$TF1 = \frac{(s+z1) \cdot (s+z2)}{(s+p1) \cdot (s+p2)}$$

$$z_{1,2} = -\frac{Lx + C2 \cdot R2 \cdot R1}{2 \cdot Lx \cdot C2 \cdot R2} \pm \sqrt{\left(\frac{Lx + C2 \cdot R2 \cdot R1}{2 \cdot Lx \cdot C2 \cdot R2}\right)^2 - \frac{R1}{Lx \cdot C2 \cdot R2}}$$

$$p_{1,2} = -\frac{Lx + C2 \cdot R2 \cdot R1}{2 \cdot Lx \cdot C2 \cdot R2} \pm \sqrt{\left(\frac{Lx + C2 \cdot R2 \cdot R1}{2 \cdot Lx \cdot C2 \cdot R2}\right)^2 - \frac{R1+R2}{Lx \cdot C2 \cdot R2}}$$

Figure 13:
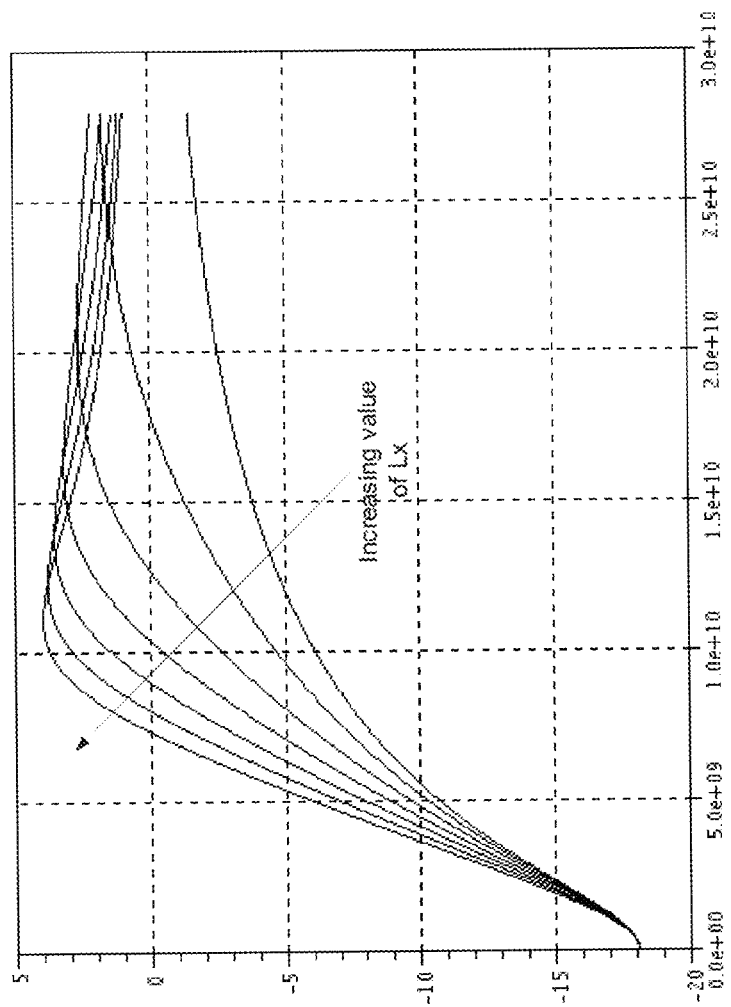
FIG. 13 shows example Transfer Functions of improved circuits without the peaking inductor

The FIG. 12 transfer function thus has two zeros and two poles, in contrast to the transfer function of FIG. 10 with a single zero and single pole. The DC level of de-emphasis in FIG. 12 is determined by (1−k1). FIG. 13 shows example transfer functions for the FIG. 12 circuit with various values of Lx. FIG. 13 illustrates that inclusion of the inductances Lx in the secondary signal paths results possible peaking without using the peaking transformers in main paths. Most important is that inclusion of Lx gives an additional zero and additional pole in transfer function that can be used to better approximate the functions that satisfy Nyquist symmetry criteria for ISI free sampling point in symbol interval.

Figure 14:
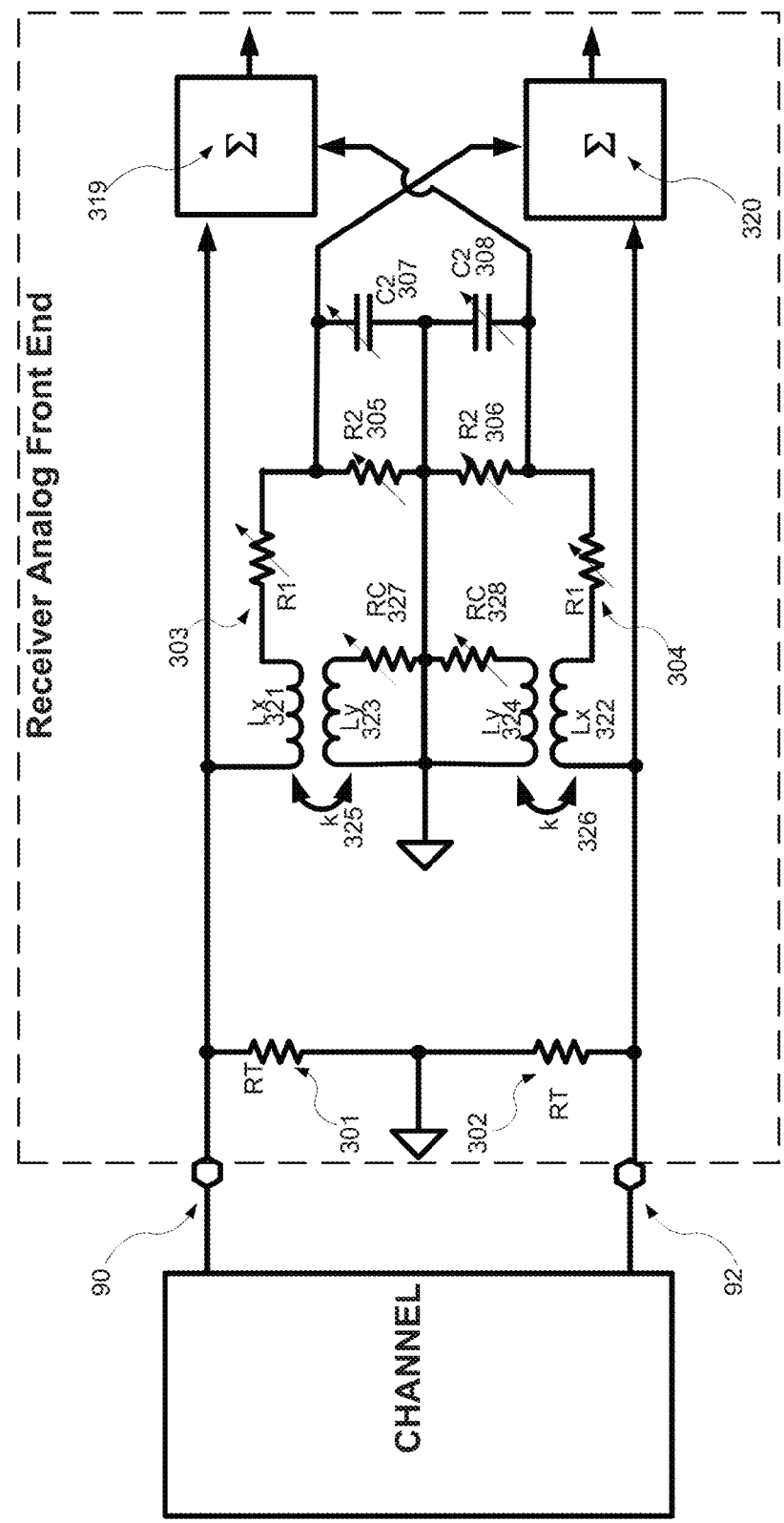
FIG. 14 shows an example equalizer circuit according to one embodiment.

The FIG. 12 circuit has two zeros and two poles that are preferably arranged from low frequency to high frequency as zero-pole-pole-zero, such that the FIG. 12 circuit provides an approximation of a band-pass filter. By adjusting the values of Lx, the transfer function can be made to better approximate a transfer function satisfying the Nyquist symmetry criteria. FIG. 14 shows an example circuit according to another embodiment which provides for adjustable values of Lx and does not use peaking transformers in the first and second main paths. The circuit of FIG. 14 is similar to the circuits of FIGS. 10 and 12, and corresponding elements are labeled with corresponding reference numerals in the form of 3xx instead of 1xx or 2xx and will not be described again to avoid repetition.

The circuit of FIG. 14 does not include load capacitors (e.g. capacitors which correspond to capacitors 117 and 118 of FIG. 10) as they are not essential, but may be included in some applications. In typical implementations there may be a small parasitic capacitance coupled to each of the main signal paths. Such parasitic capacitances may be minimized by suitable design and layout of the circuit.

The FIG. 14 circuit allows the inductances Lx to be varied through the use of transformers similar to the peaking transformers of FIGS. 10 and 12. In the FIG. 14 circuit, the inductance Lx for the first secondary signal path is provided by a primary winding 321 of a transformer which is magnetically coupled to a secondary winding 323 with a coupling coefficient k 325. The inductance Lx for the second secondary signal path is provided by a primary winding 322 of a transformer which is magnetically coupled to a secondary winding 324 with a coupling coefficient k 326. The inductances Lx can be varied by adjusting variable resistors 327 and 328 in the circuits of the secondary windings 323 and 324.

One advantage of this circuit is that it can be implemented using a very small area. Primary windings 321 and 322 do not have to be low resistance inductors which means that the area used to implement the transformers in the FIG. 14 circuit can be very small. In contrast, the primary windings 109 and 110 in FIGS. 10 and 209 and 210 in FIG. 12, should preferably be designed to have as small resistance as possible to achieve high Q. The Q of these inductors in FIGS. 10 and 12 should preferably be above 10, but the Q of primary windings 321 and 322 in the circuit of FIG. 14 can be as low as 5.

One drawback of the circuit in FIG. 14 is that the transfer function of high frequencies converges to unity gain. This is also a drawback of many existing equalizers, because transfer functions that satisfy Nyquist symmetry criteria for ISI free sampling points need to have infinite attenuation above twice the Nyquist frequency. Circuits that can provide this characteristic include those which provide peaking, as do the circuits in FIGS. 10 and 12.

Figure 15:
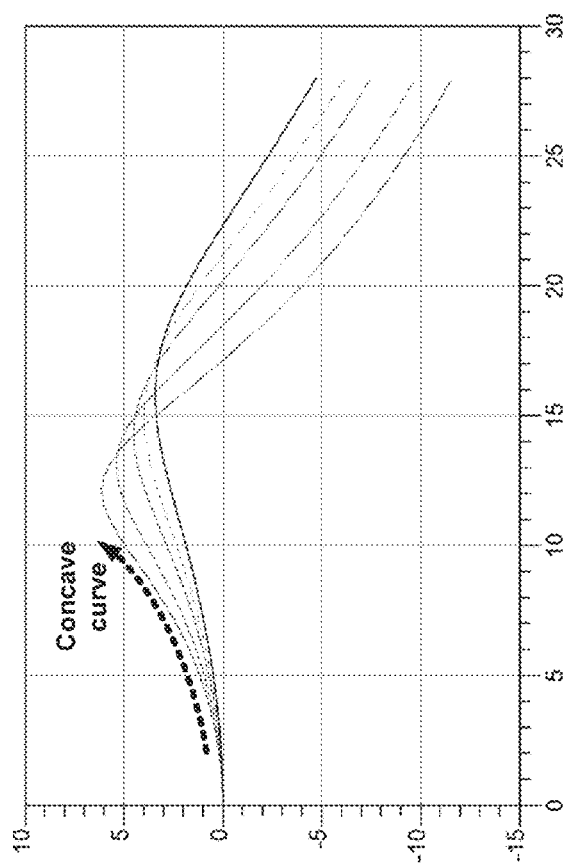
FIG. 15 shows an example of peaking circuit transfer function.

A peaking transformer in the main signal path(s) of a circuit can also add gain. One advantage is that above the peaking frequency the transfer function drops fast if the circuit has high Q. This enables such circuits to have transfer functions that approximate the Nyquist criteria for ISI free sampling. Without a peaking transformer this would not be possible without a very complex network. FIG. 15 shows that peaking circuit with high Q can result in more than 20 dB insertion loss in an octave from peak.

Figure 16:
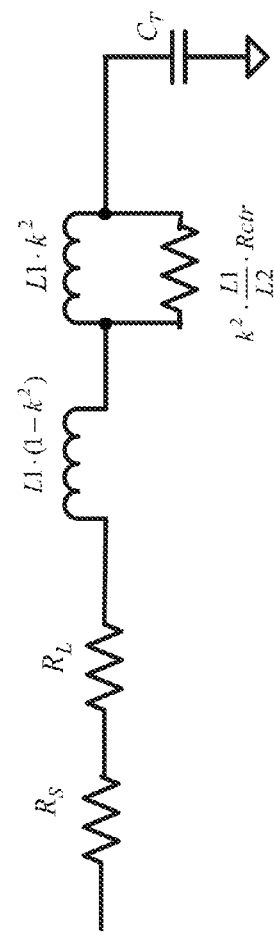
FIG. 16 shows an equivalent model of one of the main signal paths of the circuit of FIG. 10 with secondary of peaking transformer mapped into primary circuit.

FIG. 16 shows an equivalent model of one of the main signal paths of the circuit of FIG. 10 with the secondary winding of the peaking transformer mapped into the main signal path. In FIG. 16 L1 represents the value of the primary winding self-inductance, and L2 represents the value of the secondary winding self-inductance. Rs is the source resistance, which is the equivalent resistance that is seen at inputs 90/92 of FIG. 10. The k is the coefficient of the magnetic coupling between the primary and secondary winding of the peaking transformer. RL is the parasitic resistance of the primary winding. CT is the termination capacitance and Rctr is the value of the variable resistance in the secondary winding.

The transfer function of the equivalent model of FIG. 16 can be written as:

$$TF = 1/2 \cdot \frac{s \cdot L2 + Rctr}{s^3 \cdot L1 \cdot L2 \cdot (1-k^2) \cdot C_T + s^2 \cdot (L1 \cdot C_T \cdot Rctr + L2 \cdot C_T \cdot (R_L + Rs)) + s \cdot (L2 + C_T \cdot Rctr \cdot (R_L + Rs) + Rctr}$$

Figure 17:
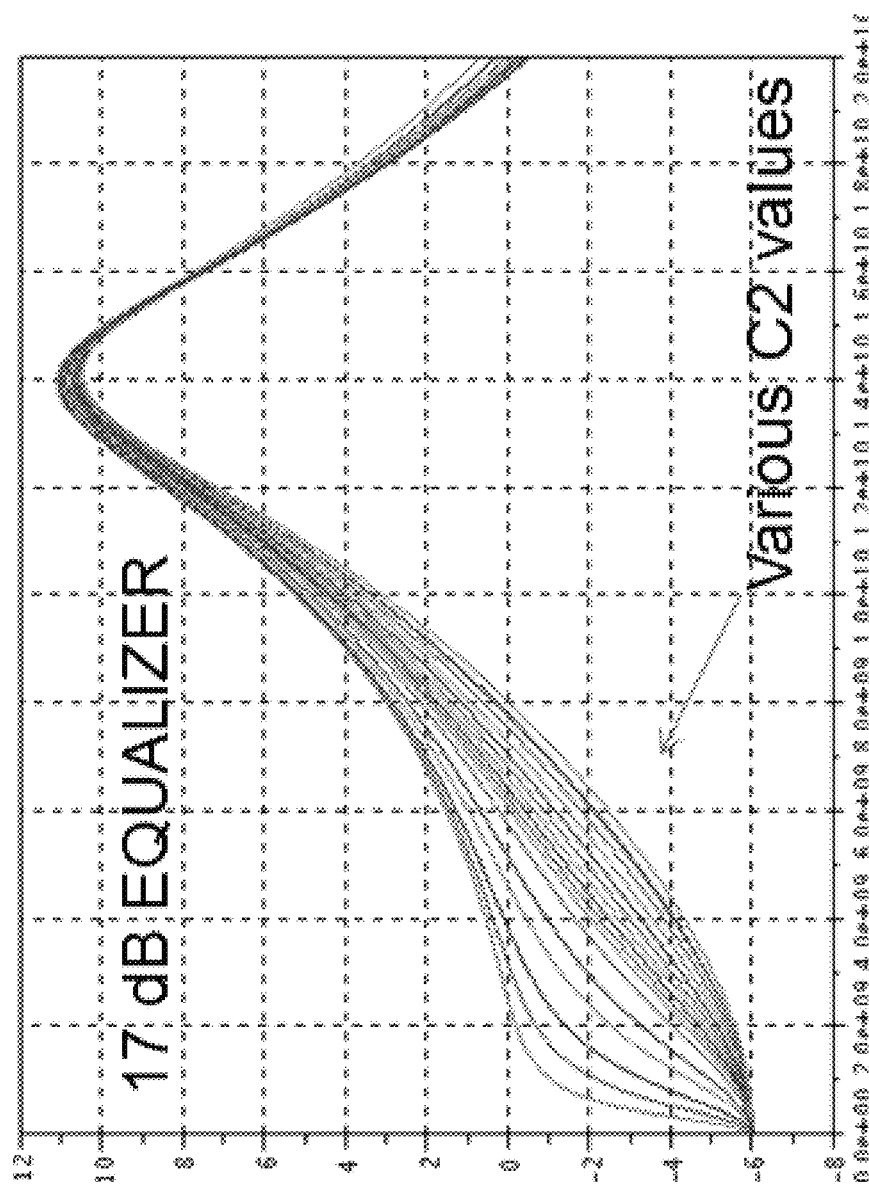
FIG. 17 shows examples of the combined effect of a low-pass filter and a variable peaking circuit.

The transfer function of a "pole-zero" circuit with low pass filtering like the FIG. 10 circuit is generally convex, as shown in FIG. 11, while the transfer function of a variable peaking transformer circuit like the FIG. 14 circuit is generally concave, as shown in FIG. 15. Combining these two types of equalization methods in proper manner can result in near perfect or perfect increase of equalization over frequency that matches the insertion loss. Accordingly, combining these two types of circuits can result in an equalizer that performs much better than either of these two types of circuits alone. FIG. 17 demonstrates the combined effect of an example circuit combining a low-pass filter circuit and a variable peaking circuit.

Figure 18:
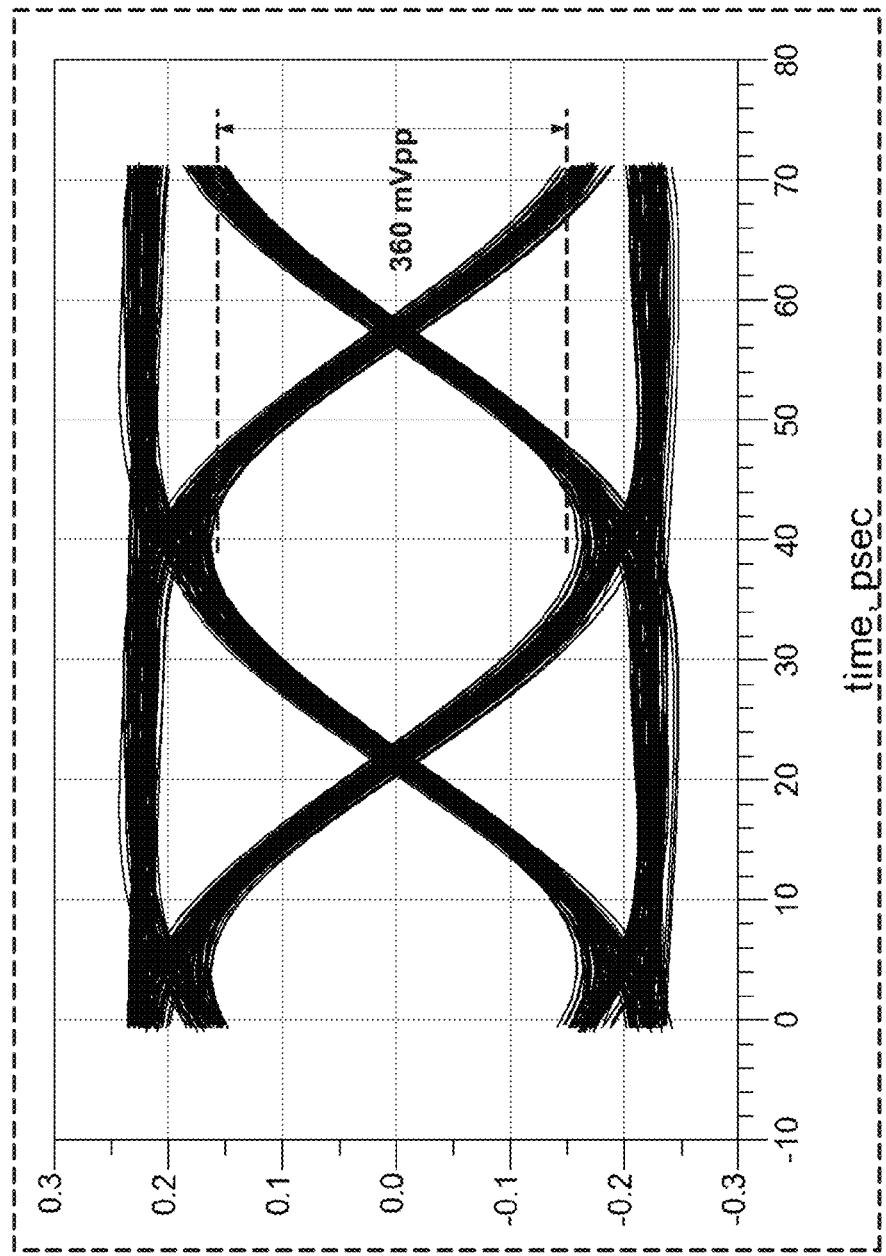
FIG. 18 is an eye diagram showing differential signals at the output of an equalizer no amplification other than the voltage amplification of an example passive peaking circuit.

FIG. 18 shows an eye diagram of an example 28 Gbps received signal without any amplification, except for the passive voltage amplification provided by the peaking circuit. This example is for a channel that has >30 dB attenuation at the Nyquist frequency. Even without active device amplification the eye opening is ~360 mVpp for 30 dB channel attenuation at the Nyquist frequency. The transmitter output voltage is 2 Vpp. If the output voltage is 1.2 Vpp the vertical eye opening will still be larger than 200 mVpp. It is possible to get even greater vertical eye opening, even 25% greater than the ones mentioned above, but in that case the transfer function will deviate from the "raised cosine" Nyquist transfer function and the horizontal eye opening will be smaller.

Figure 19:
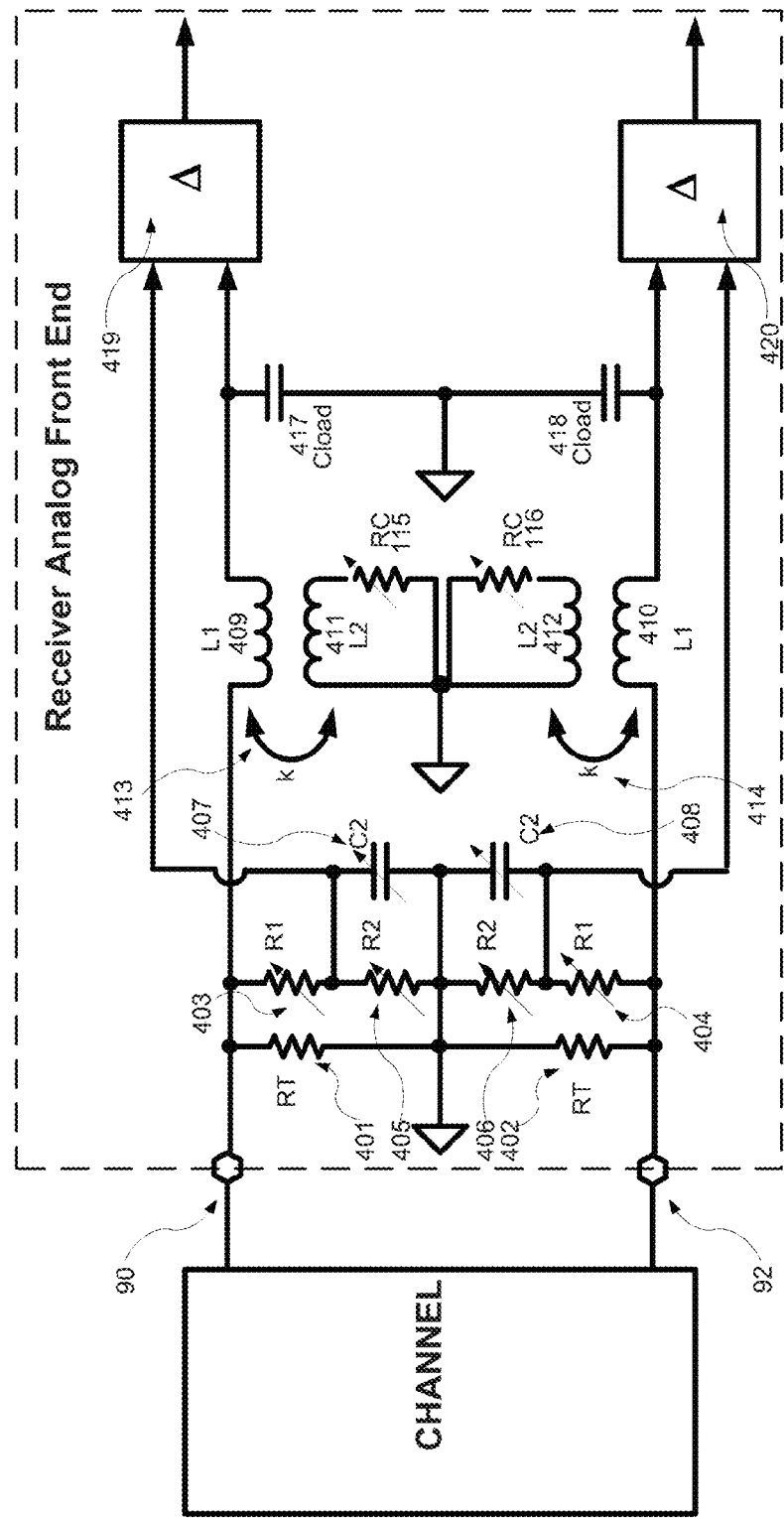
FIG. 19 shows an example equalizer circuit according to one embodiment.

FIG. 19 shows an example circuit according to another embodiment. The circuit of FIG. 19 is similar to the circuit of FIG. 10, and corresponding elements are labeled with corresponding reference numerals in the form of 4xx instead of 1xx and will not be described again to avoid repetition. The FIG. 19 circuit differs from the circuit in FIG. 10 in that in the FIG. 19 circuit the de-emphasis circuit outputs (i.e., signal on the secondary signal paths) are subtracted from the signals on the corresponding main signal paths. The combining circuits 419 and 420 in FIG. 19 are thus implemented as subtractors rather than adders.

The circuits in FIGS. 10 and 12 are somewhat preferred to the circuit of FIG. 19 because it is simpler to implement the add operation than the subtract operation. Also, simulations show that although common mode problems per arm are less for the FIG. 19 circuit as compared to the circuits in FIGS. 10 and 12, the differential output eye is significantly more open in both horizontal and vertical directions using the circuits in FIGS. 10 and 12.

Figure 20:
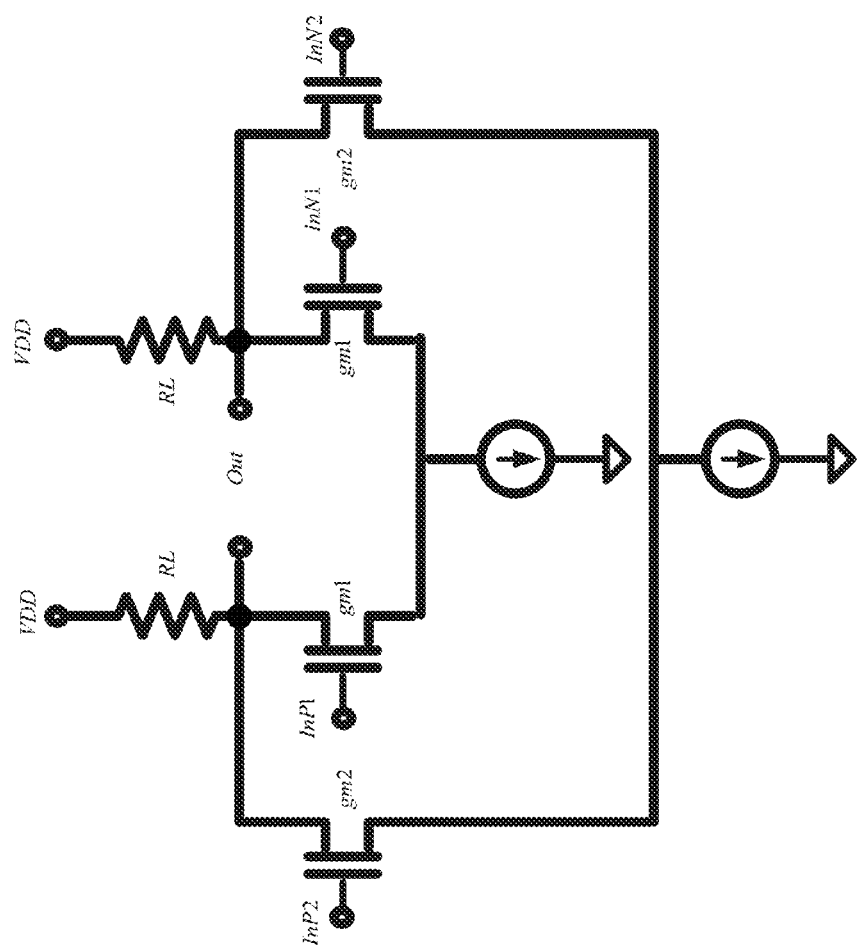
FIG. 20 shows an example adder circuit.

The adder circuits of the circuits in FIGS. 10, 12 and 14 can be in implemented in number of ways. FIG. 20 shows a preferred implementation of an adder circuit in these contexts. One advantage of the adder circuit of FIG. 20 is that choosing different size transistors will result in different values for gm1 and gm2. This provides the ability to independently choose the positions of the zero and pole for the de-emphasis circuit in FIG. 10, for example.

Figure 21:
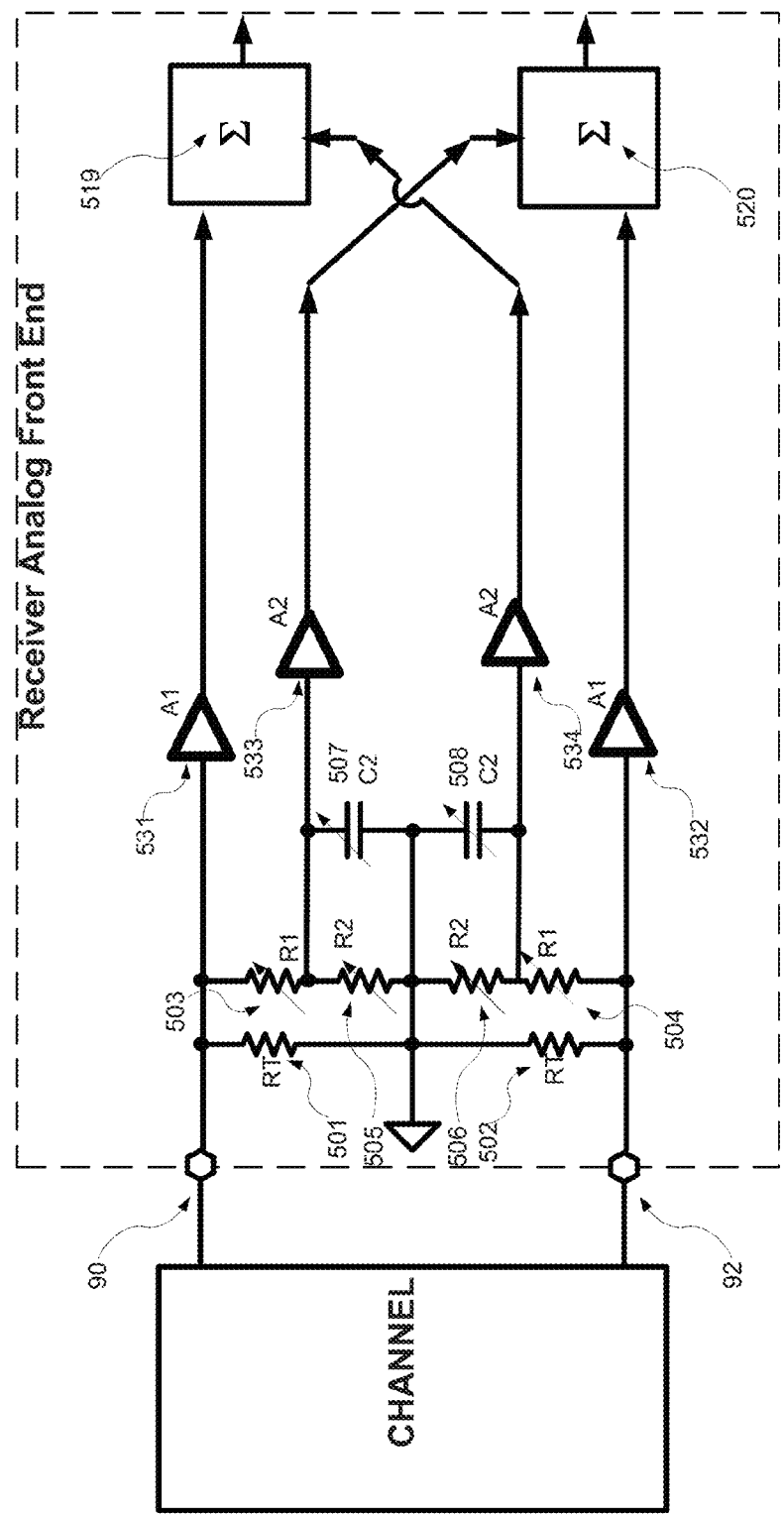
FIG. 21 shows an example equalizer circuit according to one embodiment.

Using the simple adder circuit of FIG. 20 also permits implementation of another type of low power and low area equalizer. An example of such a low power and low area equalizer is shown in FIG. 21. The circuit of FIG. 21 has a number of elements in common with the circuit of FIG. 10, and corresponding elements are labeled with corresponding reference numerals in the form of 5xx instead of 1xx and will not be described again to avoid repetition. The FIG. 21 circuit differs from the circuit in FIG. 10 in that the FIG. 21 circuit has no transformers, but instead provides amplifiers 531 and 532, each having a gain A1, in the first and second main signal paths, and amplifiers 533 and 533, each having a gain A2, in the first and second secondary signal paths.

The circuit of FIG. 21 does not include load capacitors (e.g. capacitors which correspond to capacitors 117 and 118 of FIG. 10) as they are not essential, but may be included in some applications. In typical implementations there may be a small parasitic capacitance coupled to each of the main signal paths. Such parasitic capacitances may be minimized by suitable design and layout of the circuit.

Most known equalizers that use a pole-zero network have the same problem of related pole and zero in their transfer function. The circuit of FIG. 21 addresses this issue by providing scaling factors in the main and secondary signal paths. These scaling factors are designated as Amain and Asec in the equation below, which represents the overall transfer function of the circuit of FIG. 21. The circuit of FIG. 21 allows independent selection of the DC level of de-emphasis and the zero and pole locations. This is not possible in typical continuous time linear equalizers (CTLE).

$$TFtotal = Amain - A\sec \cdot k1 \cdot \frac{1}{1 + s \cdot \tau 1} ==$$

-continued $$(Amain - k1 \cdot Asec) \cdot \frac{1 + s \cdot \frac{Amain}{Amain - k1 \cdot Asec} \cdot \tau 1}{1 + s \cdot \tau 1}$$

As is apparent from the foregoing, circuits according to the example embodiments disclosed above, and circuits similar thereto, may be implemented on a chip by one skilled in the art of designing coupled inductors on silicon dies to reduce EMI. Such implementations may take various forms depending on the desired application.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. An apparatus comprising:
 a first circuit arm having a first input for receiving a non-inverted input signal of a differential signal and a first output for outputting a non-inverted output signal of the differential signal, the first circuit arm comprising
  a first main signal path connected between the first input and the first output; and
  a first secondary signal path connected to the first input through a first voltage divider, the first secondary signal path comprising a first low pass filter;
 a second circuit arm having a second input for receiving an inverted input signal of the differential signal and a second output for outputting an inverted output signal of the differential signal, the second circuit arm comprising:
  a second main signal path connected between the second input and the second output; and
  a second secondary signal path connected to the second input through a second voltage divider, the second secondary signal path comprising a second low pass filter;
 wherein the first circuit arm comprises a first combining circuit for combining an output of the one of the first and second low pass filters with a first main signal on the first main signal path to produce the non-inverted output signal, and the second circuit arm comprises a second combining circuit for combining an output of the other of the first and second low pass filters with a second main signal on the second main signal path to produce the inverted output signal.

2. An apparatus according to claim 1 wherein the first combining circuit comprises a first subtractor connected to subtract the output of the first low pass filter from the first main signal to produce the non-inverted output, and the second combining circuit comprises a second subtractor connected to subtract the output of the second low pass filter from the second main signal to produce the inverted output signal.

3. An apparatus according to claim 1 wherein the first combining circuit comprises a first adder connected to add the output of the second low pass filter to the first main signal to produce the non-inverted output, and the second combining circuit comprises a second adder connected to add the output of the first low pass filter to the second main signal to produce the inverted output signal.

4. An apparatus according to claim 3 comprising an amplifier along each of the first main path, the second main path, the first secondary path and the second secondary path.

5. An apparatus according to claim 3 comprising a first main path inductance along the first main signal path and a second main path inductance along the second main path.

6. An apparatus according to claim 5 wherein the first main path inductance comprises a first primary winding of a first main path transformer comprising a first secondary winding magnetically coupled to the first primary winding and a first variable resistance connected to the first secondary winding, and the second main path inductance comprises a second primary winding of a second main path transformer comprising a second secondary winding magnetically coupled to the second primary winding and a second variable resistance connected to the second secondary winding.

7. An apparatus according to claim 6 comprising a first secondary path inductance connected between the first input and the first voltage divider and a second secondary path inductance connected between the second input and the second voltage divider.

8. An apparatus according to claim 3 comprising a first secondary path inductance connected between the first input and the first voltage divider and a second secondary path inductance connected between the second input and the second voltage divider.

9. An apparatus according to claim 8 wherein the first secondary path inductance comprises a first primary winding of a first secondary path transformer comprising a first secondary winding magnetically coupled to the first primary winding and a first variable resistance connected to the first secondary winding, and the second secondary path inductance comprises a second primary winding of a second secondary path transformer comprising a second secondary winding magnetically coupled to the second primary winding and a second variable resistance connected to the second secondary winding.

10. A method comprising:
   receiving an input differential signal comprising a non-inverted signal and an inverted signal;
   voltage dividing the non-inverted signal to produce a secondary non-inverted signal;
   voltage dividing the inverted signal to produce a secondary inverted signal;
   low pass filtering the secondary non-inverted and inverted signals; and,
   combining the non-inverted and inverted signals with the low pass filtered secondary non-inverted and inverted signals to produce a non-inverted output signal and an inverted output signal.

11. A method according to claim 10 wherein combining the non-inverted and inverted signals with the low pass filtered secondary non-inverted and inverted signals comprises subtracting the low pass filtered secondary non-inverted signal from the non-inverted signal to produce the non-inverted output and subtracting the low pass filtered secondary inverted signal to the inverted signal to produce the inverted output signal.

12. A method according to claim 10 wherein combining the non-inverted and inverted signals with the low pass filtered secondary non-inverted and inverted signals comprises adding the low pass filtered secondary inverted signal to the non-inverted signal to produce the non-inverted output and adding the low pass filtered secondary non-inverted signal to the inverted signal to produce the inverted output signal.

13. A method according to claim 12 comprising amplifying the non-inverted and inverted signals and the secondary non-inverted and inverted signals prior to combining the non-inverted and inverted signals with the low pass filtered secondary non-inverted and inverted signals.

14. A method according to claim 12 comprising passing the non-inverted signal through a first main path inductance and passing the inverted signal through a second main path inductance.

15. A method according to claim 14 wherein the first main path inductance comprises a first primary winding of a first main path transformer comprising a first secondary winding magnetically coupled to the first primary winding and a first variable resistance connected to the first secondary winding, and the second main path inductance comprises a second primary winding of a second main path transformer comprising a second secondary winding magnetically coupled to the second primary winding and a second variable resistance connected to the second secondary winding.

16. A method according to claim 15 comprising controlling the first main path inductance by adjusting the first variable resistance and controlling the second main path inductance by adjusting the second variable resistance.

17. A method according to claim 16 comprising passing the non-inverted signal through a first secondary path inductance prior to voltage dividing the non-inverted signal to produce the secondary non-inverted signal, and passing the inverted signal through a second secondary path inductance prior to voltage dividing the inverted signal to produce the secondary inverted signal.

18. A method according to claim 12 comprising passing the non-inverted signal through a first secondary path inductance prior to voltage dividing the non-inverted signal to produce the secondary non-inverted signal, and passing the inverted signal through a second secondary path inductance prior to voltage dividing the inverted signal to produce the secondary inverted signal.

19. A method according to claim 18 wherein the first secondary path inductance comprises a first primary winding of a first secondary path transformer comprising a first secondary winding magnetically coupled to the first primary winding and a first variable resistance connected to the first secondary winding, and the second secondary path inductance comprises a second primary winding of a second secondary path transformer comprising a second secondary winding magnetically coupled to the second primary winding and a second variable resistance connected to the second secondary winding.

* * * * *